United States Patent [19]

Taig

[11] Patent Number: 5,020,386
[45] Date of Patent: Jun. 4, 1991

[54] REVERSING MECHANISM FOR A MOTOR DRIVE

[75] Inventor: Alistair G. Taig, Edwardsburg, Mich.

[73] Assignee: Allied-Signal Inc., Morristown, N.J.

[21] Appl. No.: 441,857

[22] Filed: Nov. 27, 1989

[51] Int. Cl.[5] ............................................. F16H 35/00
[52] U.S. Cl. ....................................... 74/384; 74/354; 74/421 A
[58] Field of Search .................... 74/384, 421 A, 354, 74/358, 384, 421 A, 650; 475/153, 208; 188/72.1, 156

[56] References Cited

U.S. PATENT DOCUMENTS

| | | | |
|---|---|---|---|
| 1,170,097 | 2/1916 | Parker | 74/384 X |
| 1,397,172 | 11/1921 | Miot | 74/384 |
| 1,693,645 | 12/1928 | Fahrney | 74/358 |
| 2,023,584 | 12/1935 | Harvey | 74/358 |
| 2,101,774 | 12/1937 | Brasfield | 74/358 |
| 2,105,485 | 1/1938 | Larson | 74/358 |
| 3,638,766 | 2/1972 | Besoyan | 188/106 |
| 4,034,619 | 7/1977 | Seregni | 74/384 |
| 4,316,569 | 2/1982 | Gentile | 74/384 X |
| 4,621,535 | 11/1986 | Bronson et al. | 74/384 X |
| 4,638,957 | 1/1987 | Graves | 74/384 X |
| 4,795,002 | 1/1989 | Burgei et al. | 188/2 D |
| 4,862,766 | 9/1989 | Mölders | 74/384 X |

FOREIGN PATENT DOCUMENTS 1325666 3/1963 France .................................. 74/384

Primary Examiner—Leslie A. Braun
Assistant Examiner—David E. Henn
Attorney, Agent, or Firm—Larry J. Palguta; Ken C. Decker

[57] ABSTRACT

The reversing mechanism (10, 200) for the motor drive comprises an electric motor (39) which drives a shaft (41) having mounted thereon a first gear (44) and a shifting mechanism in the form of a flywheel (100). The first gear (44) engages a second gear (37) which engages a third gear (38), the second (37) and third (38) gears being mounted upon a carrier mechanism (12) and each engageable with a driven gear (31). The carrier mechanism (12) is engaged by a cam mechanism (60). The shifting mechanism (100) engages an axial mechanism (70) which when displaced by the shifting mechanism (100) causes the cam mechanism (60) to rotate. Rotation of the cam mechanism (60) causes displacement of the carrier mechanism (12) so that one of said second (37) and third (38) gears disengages the driven gear (31) and the other of the second (37) and third (38) gears engages the driven gear (31) in order to effect a reverse direction of rotation of the driven gear (31) when the motor (39) recommences operation. The reversing mechanism (10, 200) may be utilized in an electrically actuated parking brake system.

18 Claims, 4 Drawing Sheets

REVERSING MECHANISM FOR A MOTOR DRIVE

The invention relates generally to a reversing mechanism for a motor drive, and in particular to a reversing mechanism for a motor drive of an electrically actuated braking system.

An electrically actuated braking mechanism has been proposed previously in co-pending U.S. Pat. No. 4,944,372 entitled *"Electrically Actuated Braking System"*, and incorporated by reference herein. The electrically actuated braking system includes an electric motor which drives, by means of a load-equalizing differential, flexible connections connected with braking mechanisms. The system discloses an electric motor which is reversible in order to effect the application and release of the braking mechanisms. It is highly desirable to provide an electrically actuated braking system wherein the electric motor need rotate only in one direction of rotation. Providing a non-reversible motor within the system will reduce the cost of the system and increase the simplification and reliability thereof. It is desirable to provide a simply manufactured, low cost and highly reliable reversing mechanism for the braking system, and also one which utilizes inherent reaction forces within the braking system to assist in the reversing function.

The present invention fulfills the need for a reversing mechanism for a motor drive, comprising motor means, drive shaft means connected with gear means and shifting means, the gear means engaging displaceable gear means which is movable from a position of first engagement with a driven gear to a second position which effects a second engagement with said driven gear and an opposite direction of rotation thereof, the displaceable gear means engageable with means for causing rotational movement, the shifting means connected with the rotational movement causing means, so that a decrease in the rotation of said drive shaft means causes operation of said shifting means which effects actuation of said rotational movement causing means that causes said displaceable gear means to move from one of said positions to the other of said positions and effect an opposite direction of rotation of said driven gear.

The invention is described in detail below with reference to the drawings which illustrate the embodiments in which.

Figure 1:
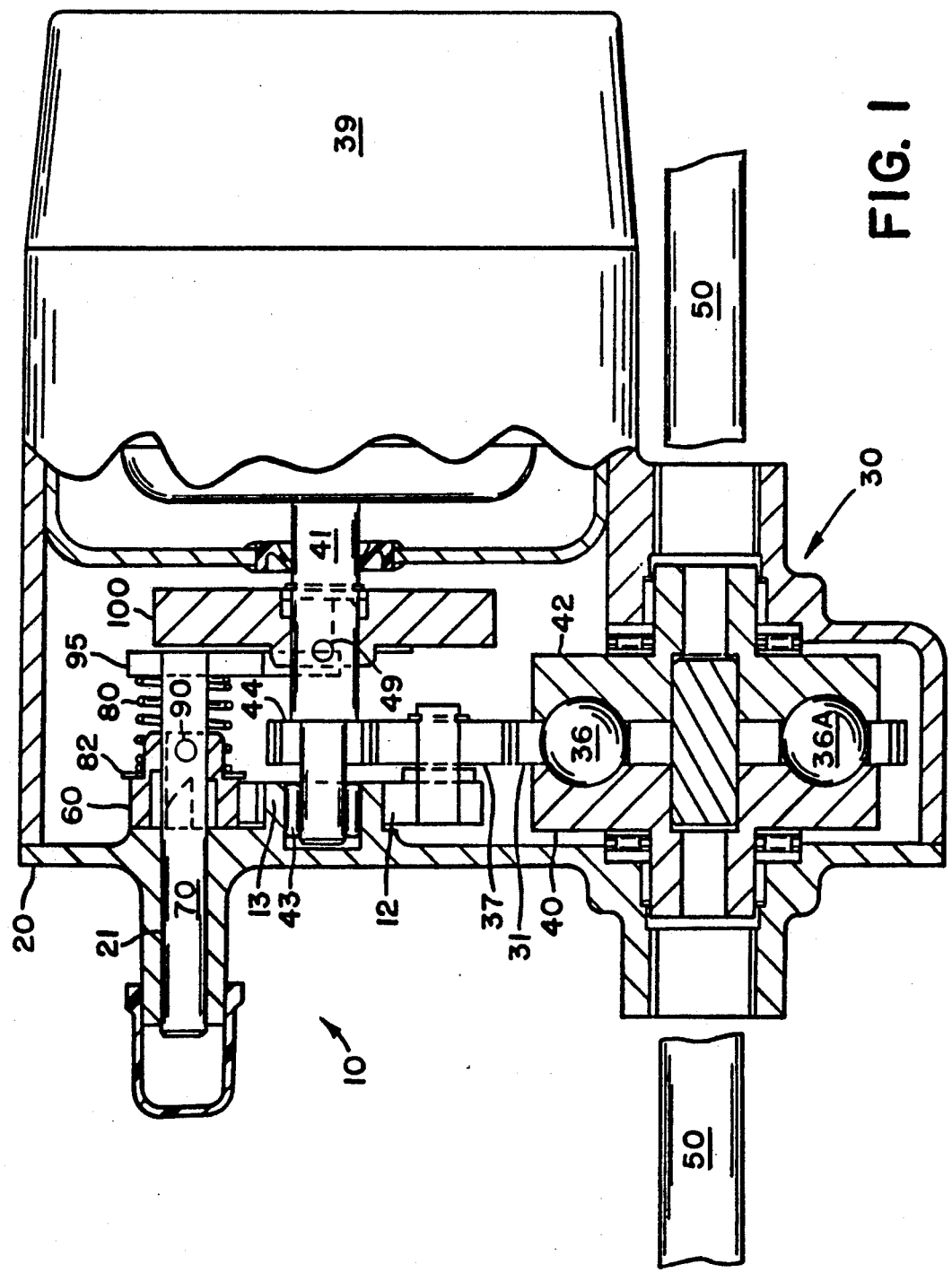
FIG. 1 is a section view of the electric motor and reversing mechanism of the present invention.
Figure 3:
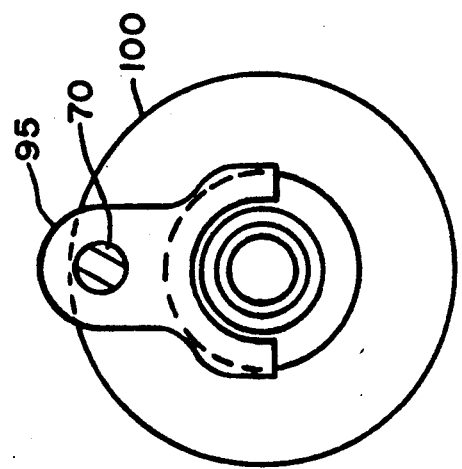
FIG. 3 is an illustration of the shifting means and yoke means.
Figure 4:
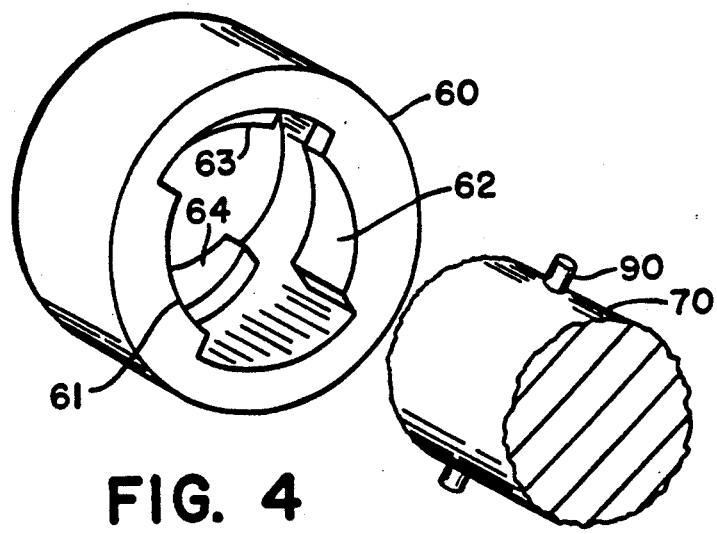
FIG. 4 is an illustration of the cam means and axial means connected with the yoke means illustrated in FIG. 3.

U.S. Pat. No. 4,944,372 discloses an electrically actuated braking system and is incorporated by reference herein. The electrically actuated braking system includes a load-equalizing differential 30 illustrated in FIG. 1 of the present application. The present invention enables a single direction of rotation electric motor to be utilized to drive the load-equalizing differential 30, rather than the reversible electric motor proposed in U.S. Pat. No. 4,944,372. Load-equalizing differential 30 includes a driven gear 31 which houses in openings a number of ball means 36 and 36A, about which is disposed plate members 40 and 42. Plate members 40 and 42 are connected with flexible connection members 50 which are connected with braking mechanisms (not shown). When operated by flexible connections 50, the braking mechanisms effect braking of the vehicle, and particularly for parking brake applications. An electric motor means 39 drives a shaft means 41 which has first gear means 44 mounted thereon. Shaft means 41 is journaled in bearings 43 received within bushing 13 of housing 20. The reversing mechanism indicated generally by reference numeral 10 includes carrier means 12 (see FIG. 2) which is rotatably mounted on bushing 13. Carrier means 12 carries rotatably a displaceable gear means comprising second gear means 37 and third gear means 38. Either one of gear means 37, 38 is engageable with driven gear 31 to effect rotation thereof. Second gear means 37 engages continuously both first gear means 44 and third gear means 38 such that second gear means 37 rotates in a direction opposite to that of third gear means 38. Accordingly, the engagement of either second gear means 37 or third gear means 38 with driven gear 31 will effect the rotation of driven gear means 31 in opposite directions. Carrier means 12 includes an end opening 15 shaped complementary to cam means 60 received therein. Cam or rotational movement means 60 is mounted rotatably upon axial means or shaft 70 received slidably within opening 21 of housing 20. Axial means 70 includes pin means 90 which extends radially from axial means 70 to be engageable with teeth 61, 62, 63, and 64 of cam means 60 (see FIGS. 4 and 5). Axial means 70 engages fixedly yoke means 95 which is located adjacent shifting means or flywheel 100. The yoke means is biased away from cam means 60 by resilient means 80 in the form of a compression spring. Resilient means 80 seats on a ring 82 which engages a shoulder of cam means 60.

Figure 6:
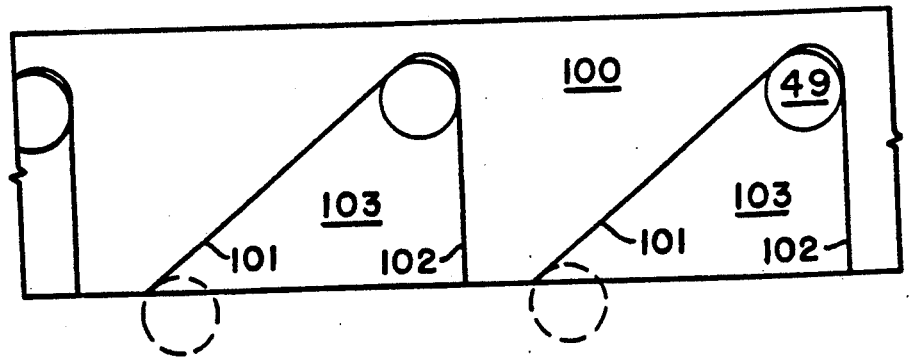
FIG. 6 is a schematic illustration of the operation of the shifting means and connecting means on the motor shaft.

Motor shaft 41 includes connection means 49 extending radially therefrom in the form of a pin which engages ramp surfaces 101 of shifting means or flywheel 100 (see FIG. 6). Shifting means 100 also includes axially extending surfaces 102 which together with respective ramps 101 define openings 103 which receive the connection means 49.

Figure 2:
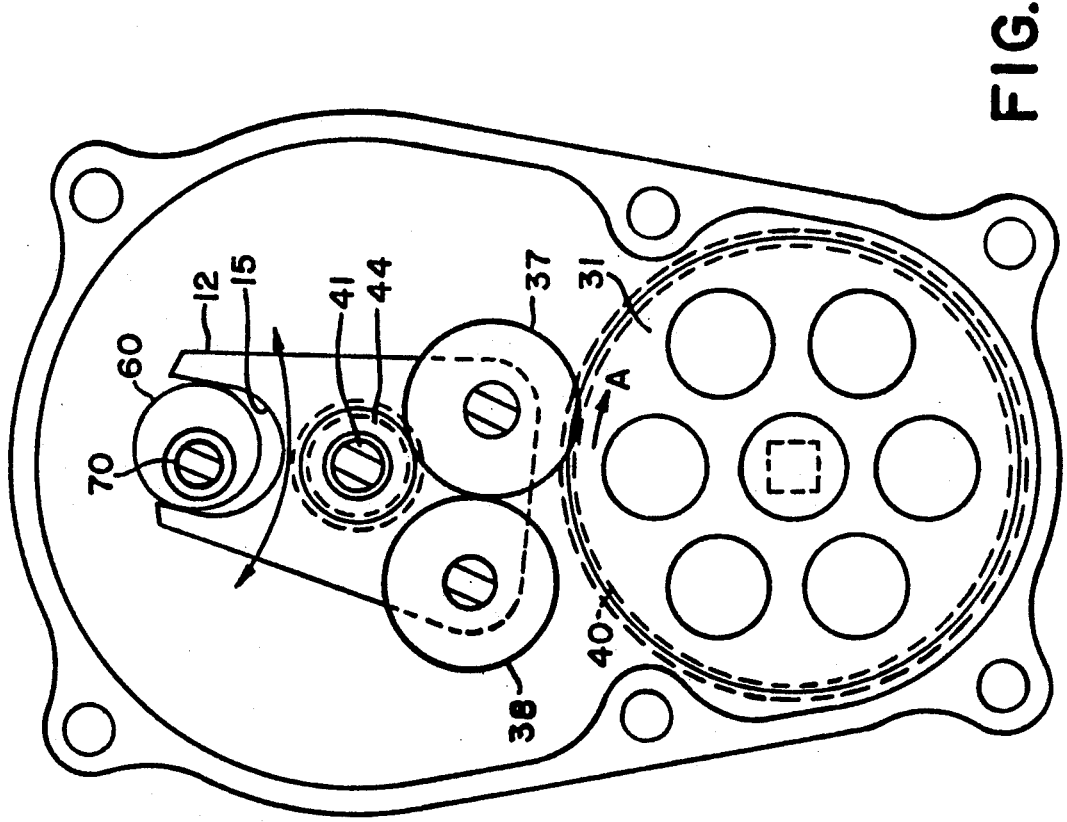
FIG. 2 is an end view of the reversing mechanism and driven gear of the load-equalizing differential.
Figure 5:
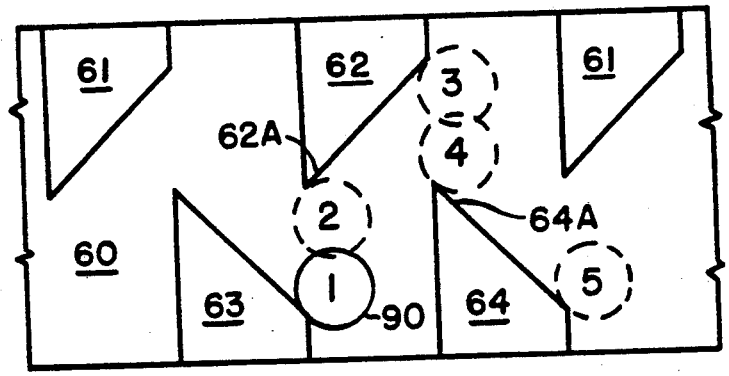
FIG. 5 is a schematic illustration of the operation of the shifting means and cam means.

The reversing mechanism described above operates as follows: Initially, either the second gear means 37 or third gear means 38 is in engagement with the driven gear 31. The electric motor means 39 drives shaft means 41 which rotates connection means 49 that is received at the corner or intersection of ramp surfaces 101 and axial surfaces 102 so that shifting means 100 is driven by shaft means 41 without any axial movement of shifting means 100 along shaft means 41. Shaft 41 also rotates first gear means 44 which effects rotation of second and third gear means 37 and 38, so that, depending upon which one of the second and third gear means is in engagement with driven gear 31, the driven gear 31 is rotated. When motor means 39 ceases operation and shaft means 41 begins to decelerate, the shifting means or flywheel 100 will tend to continue to rotate at a faster rotational speed than connection means 49 so that shifting means 100 causes ramps 101 to move along connection means 49. This results in axial displacement of shifting means 100 which axially displaces fixedly connected yoke means 95. As yoke means 95 is axially displaced, so is axial means or shaft 70. The axial displacement of shaft 70 causes pin means 90 to move among the four teeth 61-64 of cam means 60. FIG. 5 is a schematic illustration of the four teeth 61-64 of cam means 60. Note that gear tooth 61 is illustrated twice in order to illustrate the full movement of cam means 60. Pin means 90 moves only axially, but it is shown in different rotational positions which correspond to the rotational movement of cam means 60. As illustrated in FIG. 5, pin means 90 begins at position 1 during operation of motor means 39 and when the deceleration occurs and shaft 70 is caused to shift axially, pin means 90 moves to dotted-line position 2 so that as pin means 90 engages ramp portion 62A of tooth 62 it causes cam means 60 to rotate. Pin means 90 moves to dotted line position 3, wherein cam means 90 has been rotated 90°. As shaft means 41 stops rotating, then resilient means 80 returns axial shaft 70, yoke means 95, and shifting means 100 to the initial position illustrated in FIGS. 1 and 6. As shaft 70 and pin means 90 move axially to the right in FIG. 1, pin means 90 moves from dotted line position 3 to positions 4 and 5 of FIG. 5 which causes another 90° of rotation of cam means 60 as pin means 90 traverses along the ramp portion 64A of tooth 64. Referring to FIG. 2, it can be seen that the rotation of cam means 60 about 90° will cause a disengagement of second gear means 37 from driven gear 31. A further 90° of rotation of cam means 60 so that it is moved through 180° of rotation from the position illustrated in FIG. 2, causes third gear means 38 to engage driven gear 31 as carrier 12 is displaced by cam means 60. Thus, when motor means 39 comes to a complete stop, second gear means 37 disengages driven gear 31 and third gear means 38 engages driven gear 31 so that when the motor again begins operation, driven gear 31 will be rotated in an opposite direction. Each time electric motor means 39 ceases operation and deceleration of drive shaft 41 commences, shifting means 100 will cause axial displacement of axial means 70 and pin means 90 so that cam 60 is rotated eventually through 180° when shaft means 41 has come to a complete stop, wherein one of the second and third gear means is disengaged from driven gear 31 and the other of the second and third gear means engages the driven gear 31.

Reversing mechanism 10 utilizes the axial movement of flywheel or shifting means 100 during deceleration of drive shaft means 41 to effect the axial movement of pin means 90 which causes the rotation of cam means 60. The rotation of cam means 60 causes carrier means 12 to swing about its rotatable mounting on bushing 13 of body 20 so that one of the second and third gear means disengages driven gear 31 and the other of the second and third gear means engages driven gear 31 when first gear means 44 and driven gear 31 have stopped rotation.

The reversing mechanism of the present invention utilizes the inherent braking forces of the parking brake system to assist in its operation. Referring to FIG. 2, second gear means 37 may engage driven gear 31 during the application phase of braking. As the rotation of driven gear 31 begins to cease, reaction forces caused by the braking mechanisms at the wheels tend to rotate driven gear 31 in a counter rotation direction (Arrow A). Thus, when the reversing gear mechanism commences its operation, there is an inherent tendency of the reaction forces to assist in the swinging or rotation of carrier means 12 so that second gear means 37 will disengage from driven gear 31. Likewise, when the braking system is operated during the release phase of braking, there will be reaction forces that tend to force third gear means 38 away from the driven gear 31 so that when motor means 39 ceases rotation of shaft means 41, the reaction forces tend to swing third gear means 38 away from driven gear 31 and, thus, assist in the operation of the reversing mechanism.

Figure 7:
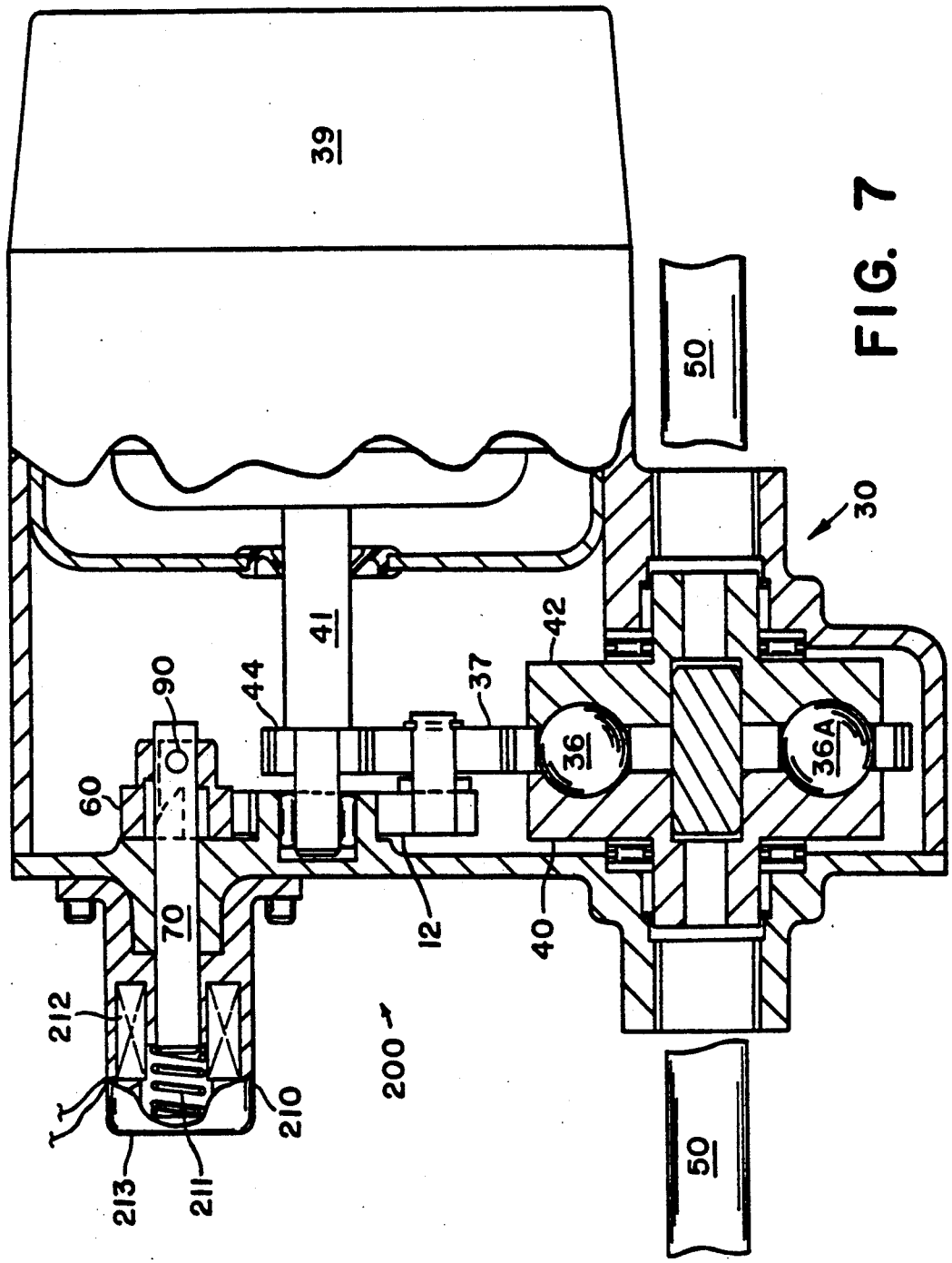
FIG. 7 is a schematic illustration of a reversing mechanism operated by solenoid means.

Referring to FIG. 7, a reversing gear mechanism 200 utilizes a solenoid means 210. Solenoid means 210 includes a spring 211 and coil means 212 enclosed in housing 213. Solenoid means 210 operates to shift axially the axial means or shaft 70 so that it causes rotation of cam means 60 and the movement of carrier means 12. This mechanism eliminates the need for a shifting means or flywheel 100, connection means 49, yoke means 95, and resilient means 80. As solenoid means 210 moves shaft means 70 axially during actuation and deactuation, pin means 90 will engage the teeth 61-64 of cam means 60 in the same manner as described above. This will cause an appropriate operation of the reversing gear mechanism in the same manner as described above, but without the utilization of the shifting means 100, connection means 49, yoke means 95, and resilient means 80. An electronic controller such as that disclosed for the electrically actuated braking system of U.S. Pat. No. 4,944,372 can be utilized to operate appropriately solenoid means 210.

I claim:

1. A reversing mechanism for a motor drive, comprising motor means, shaft means connected with said motor means, first gear means connected with said shaft means and engaging second gear means, the second gear means engageable with a driven gear, third gear means engaging said second gear means, carrier means which carries rotatably said second and third gear means, means for axial shifting connected with said shaft means, the axial shifting means connected with axial means which is biased axially by resilient means, and cam means connected with said axial means and carrier means, so that rotation of said shaft means by said motor means causes said first gear means to rotate said second and third gear means, the second gear means rotating said driven gear when engageable therewith, a cessation of rotation of said shaft means causing said shifting means to shift and effect axial displacement of the axial means which effects rotation of the cam means, rotation of the cam means displacing the carrier means to cause said second gear means to disengage the driven gear and said third gear means to engage said driven gear.

2. The reversing mechanism in accordance with claim 1, wherein said shifting means comprises ramp means engaged by a connecting member extending from said shaft means.

3. The reversing mechanism in accordance with claim 1, wherein said carrier means includes an opening receiving said cam means.

4. The reversing mechanism in accordance with claim 1, wherein said cam means includes an interior opening having teeth means therein, the teeth means engaged by pin means extending from said axial means.

5. The reversing mechanism in accordance with claim 4, wherein said axial displacement of the axial means causes the pin means to move among the teeth means to cause said cam means to rotate so that said cam means displaces said carrier means which causes one of engagement and disengagement of said second and third gear means.

6. The reversing mechanism in accordance with claim 1, wherein the shifting means includes yoke means to which is connected said axial means.

7. The reversing mechanism in accordance with claim 6, wherein the resilient means extends between said yoke means and cam means.

8. The reversing mechanism in accordance with claim 7, wherein the yoke means fixedly engages said axial means so that axial displacement of the yoke means causes axial displacement of the axial means.

9. The reversing mechanism in accordance with claim 1, wherein said driven gear comprises a part of a load-equalizing differential.

10. The reversing mechanism in accordance with claim 9, wherein said reversing mechanism and load-equalizing differential comprise part of an electrically actuated braking system.

11. A reversing mechanism for a motor drive, comprising motor means, motor drive shaft means connected with gear means and shifting means, the gear means engaging displaceable gear means which is movable from a position of first engagement with a driven gear to a second position which effects a second engagement with said driven gear and an opposite direction of rotation thereof, the displaceable gear means engageable with means for causing rotational movement, the shifting means connected with the rotational movement causing means, so that a decrease in the rotation of said drive shaft means causes operation of said shifting means which effect actuation of said rotational movement causing means that causes said displaceable gear means to move from one of said positions to the other of said positions and effect an opposite direction of rotation of said driven gear, and the reversing mechanism being connected, via the displaceable gear means, with a load-equalizing differential which includes as part thereof the driven gear.

12. The reversing mechanism in accordance with claim 11, wherein said reversing mechanism and load-equalizing differential comprise part of an electrically actuated braking system.

13. A reversing mechanism for a motor drive, comprising motor means, motor drive shaft means connected with gear means and shifting means, the gear means engaging displaceable gear means which is movable from a position of first engagement with a driven gear to a second position which effects a second engagement with said driven gear and an opposite direction of rotation thereof, the displaceable gear means engageable with means for causing rotational movement, the shifting means connected with the rotational movement causing means, so that a decrease in the rotation of said drive shaft means causes operation of said shifting means which effects actuation of said rotational movement causing means that causes said displaceable gear means to move from one of said positions to the other of said positions and effect an opposite direction of rotation of said driven gear, and the rotational movement causing means comprising cam means.

14. The reversing mechanism in accordance with claim 13, wherein the cam means has an interior opening with teeth means therein, the shifting means operatively effecting operation of the cam means.

15. A reversing mechanism for a motor drive, comprising motor means, motor drive shaft means connected with gear means, the gear means engaging displaceable gear means which is movable from a position of first engagement with a driven gear to a second position which effects a second engagement with said driven gear and an opposite direction of rotation thereof, the displaceable gear means engageable with means for causing rotational movement and which receives actuation signals from control means, so that a decrease in the rotation of said drive shaft means corresponds substantially with actuation of said rotational movement causing means that causes said displaceable gear means to move from one of said positions to the other of said positions in order to effect an opposite direction of rotation of said driven gear, and the rotational movement causing means including cam means.

16. The reversing mechanism in accordance with claim 15, wherein the rotational movement causing means includes solenoid means which operates the cam means.

17. The reversing mechanism in accordance with claim 16, wherein the cam means includes axial solenoid shaft means biased by resilient means and including pin means.

18. The reversing mechanism in accordance with claim 17, wherein the cam means includes internal teeth means and the pin means engages the internal teeth means so that axial displacement of the pin means by the solenoid means effects rotational movement of the cam means and displacement of the gear means.

* * * * *